C. TER COCK.
APPARATUS FOR THE CONTROL OF VARIABLE SPEED-GEARS.
APPLICATION FILED JAN. 21, 1922.
1,414,933. Patented May 2, 1922.
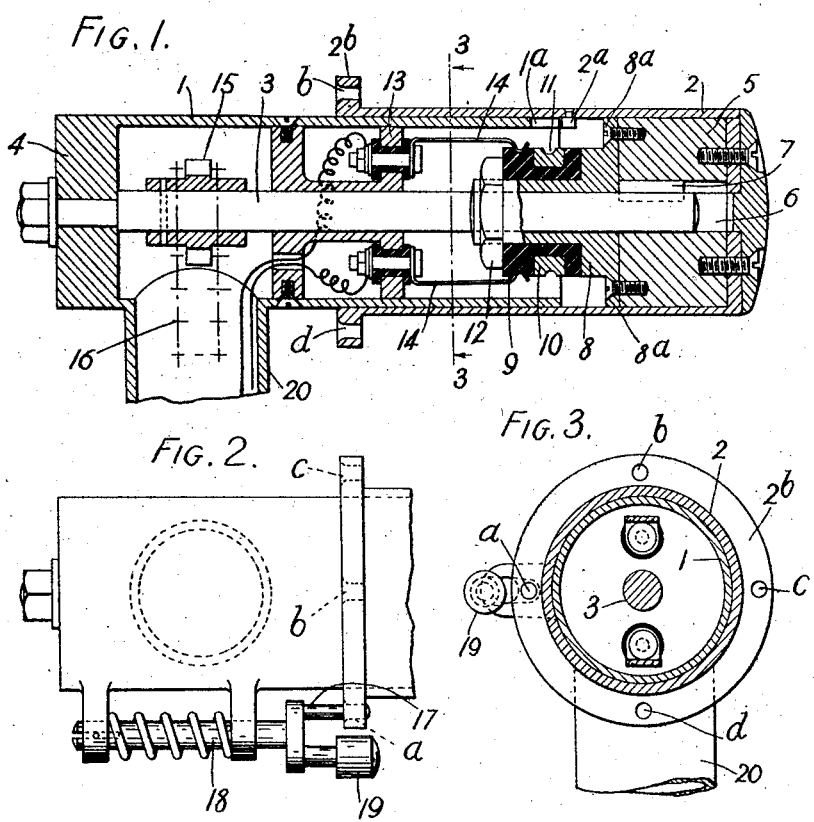
Inventor
Chris ter Cock
by Wilkinson & Giusta
Attorneys.

UNITED STATES PATENT OFFICE.

CHRIS TER COCK, OF FLEVORAMA, NAARDEN, NETHERLANDS.

APPARATUS FOR THE CONTROL OF VARIABLE-SPEED GEARS.

1,414,933. Specification of Letters Patent. Patented May 2, 1922.

Application filed January 21, 1922. Serial No. 530,898.

*To all whom it may concern:*

Be it known that I, CHRIS TER COCK, an engineer and Dutch subject, residing Uit en Thuis, Flevorama, Naarden, Netherlands, (formerly of 63 Eemnesserweg, Baarn, Netherlands,) have invented certain new and useful Improvements in Apparatus for the Control of Variable-Speed Gears, of which the following is a specification.

This invention relates to apparatus for the control of variable speed gears and has particular reference to gears of the kind described in the specification of my prior British Patent No. 105192 when applied to a self-propelled vehicle.

Such variable speed gear is provided with a control or selector shaft which is rotated through different angles according to the particular gear selected for operation and is also moved in the direction of its axis to operate the selected gear this latter movement being preferably brought about by electromagnets or solenoids.

According to the present invention the movements of the selector shaft are controlled by a tubular handle mounted on or near the steering wheel of the vehicle, this handle being capable of rotary movement to rotate the selector shaft, and so make the electrical connections necessary for bringing about the required axial movements of the selector shaft to operate the various gears, and also capable of movement in the direction of its axis, when the gears are in the neutral position. This axial movement completes the electric circuits for energizing the solenoid which puts the reverse gear into operation.

In one preferred construction the handle comprises a fixed inner tubular portion forming or containing a bearing for one end of a shaft or spindle which runs centrally through the handle. Over one end of this fixed portion is fitted the handle proper in such a manner that it can be turned relatively to it, and can slide telescopically over the fixed part, when in a predetermined position. The end of the spindle enters a hole in a block in the rotatable handle and is squared, keyed, or otherwise formed so that the rotary movement of the handle also effects the turning of the shaft, although the handle can slide upon it.

The fixed tubular member or a casing containing it is mounted upon the end of a tubular stem which may be supported on the foot-board of the vehicle and through this stem passes a chain or shaft engaging at the top with a sprocket wheel or bevel fixed on the spindle and at the bottom engaging with a similar sprocket wheel or bevel mounted on the selector shaft, or on a counter shaft geared thereto.

This arrangement of gearing is preferably such that the angular movement of the selector shaft is equal to that of the handle and its spindle.

Fixed in the stationary tubular portion of the handle is a sleeve or support carrying two spring contact arms, which may extend parallel to the axis of the handle, and in all positions of the rotatable tubular part, except when it is moved axially to bring the reverse gear into operation, the ends of these contacts rest upon an insulating sleeve mounted on an inner sleeve fixed within the rotatable handle. Conveniently the ends of the contact springs rest in a circumferential groove in the insulation so that they tend to steady the handle whilst allowing of its rotation. When the rotatable handle is moved axially to bring the reverse gear into operation these contact springs engage flats on contact blocks mounted on but insulated from the inner sleeve and connected to the electric circuits in which are the solenoids for moving the selector shaft axially.

When the handle is in such a position that the contact springs rest upon the insulating sleeve, the rotatable portion of the handle can be turned in either direction and this movement not only rotates the selector shaft but also moves the contacts on discs or rings which are mounted on a shaft geared to the selector shaft and brings the contacts into the appropriate positions relatively to brushes which co-operate therewith and completes the electric circuits in which are the solenoids for moving the selector shaft axially and for operating locking pins or means for the gears. The details of the construction of these contacts on a shaft geared to the selector shaft or otherwise outside the handle, do not form part of the present invention which is concerned with the controlling handle and not with the contacts and mechanism outside the handle which operate the gear.

The longitudinal motion of the handle necessary to bring the spring contacts into co-operative action with the contact blocks to bring the reverse gear into or out of operation can only take place when the handle has been rotated so that the gear and all the contacts outside the handle are in the neutral position. This is ensured for instance by a pin on the rotatable part of the handle engaging with a slot in the fixed portion. The handle may be arranged so that the rotatable portion has either to be pushed in or pulled out to bring the spring contacts into or out of engagement with the contact blocks. When the springs rest upon the insulating sleeve, the rotary part may be turned in one direction or the other to effect by the turning of the shaft, the necessary changes in the electrical connections to bring about the required changes in the gear.

In order that the various positions of the rotary handle corresponding to the various gears may be definite, some mechanism such as a spring-controlled plunger stop may be provided. For instance such a stop may be fitted in the end of the fixed portion of the handle and may act in conjunction with a disc carried by the spindle and having recesses corresponding to the various positions, or a spring stop may be arranged on the outside of the fixed portion of the handle to co-operate with holes in a flange or ring in the rotary part.

An embodiment of the invention will now be described with reference to the accompanying drawings in which:

Fig. 1 is a longitudinal section of the control handle;

Fig. 2 a plan view of the fixed part or end of the handle and

Fig. 3 a section on the line 3—3 of Fig. 1.

The complete handle consists of a fixed tubular member 1, and a rotary tubular member 2 fitting over the outer end of the member 1, and capable of telescoping therein only when in a predetermined position.

A shaft 3 extends axially through the two members, being supported in bearings 4, 5, therein. A space 6 is provided in bearing 5 to allow of the axial displacement of the handle 2 on the shaft. For this purpose the shaft and handle are connected together by a key 7 or equivalent so that while the handle and shaft must always rotate together the former may be slidden along the latter.

The bearing 5 is provided with an extension or tubular attachment 8, here shown as an attachment secured to it by screws 8ª, carrying an insulating sleeve 9, in which is mounted a contact ring or blocks 10, provided with a circumferential groove 11. The sleeve 9 is held in place on the tubular extension 8 by means of a nut 12.

The fixed or stationary part 1 of the handle carries towards its open end an internal collar 13, which acts as a central bearing for the shaft 3, and is screwed or otherwise secured to the member 1. On the collar 13 are mounted two spring contacts 14, the outer free ends of which normally rest on the insulating sleeve 9 of the rotary handle, but are adapted, when the handle 2 is pressed in to engage the groove 11 and thus complete the electric circuit for bringing about the "reverse" engagement of the gears. For this purpose the handle 2 is provided with a stud 2ª which comes opposite a corresponding slot 1ª in the fixed member 1 when the handle is rotated into the "reverse" position, whereupon it can be pressed in to make the necessary electric connection.

On the shaft 3 within the fixed member 1 is mounted a toothed wheel 15 with which a chain 16 engages, and from which the rotary motion of the shaft 3 is transmitted to the gear change control shaft (not shown).

Only the "reverse" contacts are arranged in the handle, those for 1st, 2nd and 3rd speed are arranged on a shaft geared to the selector shaft and are controlled by the rotary movements of the handle and toothed wheel 15.

In order that the operation of the changing gear may be effected easily and without the driver having to watch the extent to which he is turning the handle 2, I provide a spring pressed pin 17, on the exterior of the fixed member 1, which pin is adapted to enter the holes a, b, c, d in the flange 2ᵇ, of the rotary handle 2. These holes may correspond respectively to a neutral and "reverse" 1st speed, 2nd speed, and 3rd speed.

The pin 17 is carried by a spring controlled rod 18 having a knob 19 adapted to be operated by the thumb of the driver. When he desires to change speed he takes hold of the handle 2 and his thumb naturally rests against the knob 19, which he first presses in and thus releases the handle 2, which he then turns in order to engage the desired gear. In this turning movement his thumb will slip off the knob 19 so that the pin 17 under the pressure of its spring, will thus be ready to enter the next hole in the flange 2ᵇ, and thus lock the handle in its adjusted position.

The fixed member 1 of the handle is supported on a tube 20 which may be conveniently secured to the floor, the chain 16 passing down this tube to the gear selector shaft.

It is to be understood that various alterations may be made in the details of construction of the handle without departing from the spirit of this invention. For instance although it is preferred to mount the spring contacts on the fixed part of the handle and the contact blocks on the rotatable portion, the reverse arrangement may be employed, the spring contacts being mounted on the rotatable portion and co-operating with the fixed contact blocks. Again, any convenient form of gearing may be used to connect the spindle of the handle with the selector shaft or the other shaft geared therewith. For instance instead of a chain or band for transmitting the rotary motion of the shaft 3 to the gear selector shaft I may employ a shaft or Bowden wire, the outer cable or sheath of which is fixed to the fixed member 1 and to the housing of the gear shaft while the ends of the inner cable are connected to drums in the shaft 3 and on the selector shaft. I am thus enabled to mount the handle on the steering wheel if desired, without interfering with the turning of the steering wheel.

The wires for connecting the contacts for the reverse gear circuits may be contained in the handle and may pass down the tubular stem so that there are no wires outside the handle.

What I claim and desire to protect by Letters Patent is:—

1. A device as described comprising a tubular member, a selector shaft journaled therein and adapted to be connected to mechanism to be operated, contacts within the tubular member, a second tubular member rotatable and axially slidable upon the first tubular member and having connection to said shaft whereby to rotate the shaft therewith but permitting of the axial sliding of the second tubular member with respect to the shaft, a contact carried by the second tubular member and adapted to cooperate with the contacts within the first mentioned tubular member, said tubular members having means therebetween for permitting of the axial sliding of the second member when the latter member and selector shaft occupy a definite angular position, substantially as described.

2. In a device as described, a fixed tubular member, a shaft journaled therein and adapted to be connected to mechanism to be operated, said shaft projecting beyond the member, a tubular operating member keyed to the shaft whereby to rotate the shaft therewith but permitting of the sliding of the operating member on the shaft, said operating member being rotatable and axially slidable upon the fixed member, cooperating contacts carried by said members, one of said members having a slot in its edge, the other member having a projection for engaging said edge and adapted to enter the slot, substantially as described.

In testimony whereof I affix my signature in presence of two witnesses.

CHRIS ter COCK.

Witnesses:
H. Y. KNIPPERT,
H. GHANGENDYK.